(12) United States Patent
Juslin et al.

(10) Patent No.: US 9,270,034 B2
(45) Date of Patent: Feb. 23, 2016

(54) WIRE CLAMPING ASSEMBLY

(75) Inventors: Mika Juslin, Espoo (FI); Wilber Diaz, Vantaa (FI)

(73) Assignee: ABB TECHNOLOGY OY, Helsinki (FI)

( * ) Notice: Subject to any disclaimer, the term of this patent is extended or adjusted under 35 U.S.C. 154(b) by 90 days.

(21) Appl. No.: 13/431,518

(22) Filed: Mar. 27, 2012

(65) Prior Publication Data

US 2013/0048799 A1 Feb. 28, 2013

(30) Foreign Application Priority Data

Aug. 26, 2011 (EP) .................................... 11178967

(51) Int. Cl.
*F16L 3/22* (2006.01)
*H01R 4/38* (2006.01)
*H02G 3/32* (2006.01)
(Continued)

(52) U.S. Cl.
CPC ................ *H01R 4/38* (2013.01); *F16L 3/2235* (2013.01); *H01R 4/64* (2013.01); *H02G 3/32* (2013.01); *F16L 3/02* (2013.01); *F16L 3/22* (2013.01); *F16L 3/223* (2013.01); *F16L 3/233* (2013.01); *H01R 4/42* (2013.01); *H01R 4/44* (2013.01); *H01R 4/46* (2013.01)

(58) Field of Classification Search
CPC ................ F16L 3/02; F16L 3/22; F16L 3/23; F16L 3/233; F16L 3/137; F16L 3/24; F16L 33/04; F16L 3/00; F16L 3/2235; F16L 3/223; F16B 2/08; Y10T 24/217; Y10T 24/21; Y10T 24/2191; H02G 3/32

USPC ......... 248/74.1, 74.2, 74.3, 56.62, 66, 67, 69, 248/71, 316.1, 560, 61, 68.1, 512, 75, 65, 248/70, 230.9; 24/16 PB, 20 LS, 68 R, 115 H, 24/196, 197, 301, 302; 439/501
See application file for complete search history.

(56) References Cited

U.S. PATENT DOCUMENTS 4,770,378 A * 9/1988 Onishi et al. ................. 248/68.1
4,907,766 A * 3/1990 Rinderer ......................... 248/57
(Continued)

FOREIGN PATENT DOCUMENTS

EP        0 814 554 A2    12/1997
FR        1 089 557 A     3/1955
(Continued)

OTHER PUBLICATIONS

Search Report issued on Jan. 23, 2012, by European Patent Office for Application No. 11178967.3.

*Primary Examiner* — Syed A Islam
*Assistant Examiner* — Taylor Morris
(74) *Attorney, Agent, or Firm* — Buchanan Ingersoll & Rooney PC

(57) ABSTRACT

An exemplary wire clamping assembly is disclosed which includes a support body, a clamping strip and at least one clamping screw. The support body can include a first surface and a second surface, the at least one clamping screw being adapted to direct a clamping force to a clamping force receiving portion of the clamping strip for clamping at least one wire between the clamping strip and the first surface of the support body. The clamping strip can be a flexible strip, and the clamping force receiving portion of the clamping strip is, in use, located on the side of the second surface of the support body.

11 Claims, 2 Drawing Sheets

(51) Int. Cl.

| | | |
|---|---|---|
| *H01R 4/64* | (2006.01) | |
| *F16L 5/00* | (2006.01) | |
| *E21F 17/02* | (2006.01) | |
| *F16L 3/00* | (2006.01) | |
| *F16L 3/12* | (2006.01) | |
| *B65D 63/00* | (2006.01) | |
| *B65D 67/02* | (2006.01) | |
| *F16L 33/00* | (2006.01) | |
| *B25B 31/00* | (2006.01) | |
| *F16B 7/08* | (2006.01) | |
| *F16L 33/02* | (2006.01) | |
| *A43C 11/00* | (2006.01) | |
| *A44B 1/04* | (2006.01) | |
| *A44B 11/25* | (2006.01) | |
| *F16L 3/223* | (2006.01) | |
| *F16L 3/233* | (2006.01) | |
| *F16L 3/02* | (2006.01) | |
| *H01R 4/42* | (2006.01) | |
| *H01R 4/44* | (2006.01) | |
| *H01R 4/46* | (2006.01) | |

(56) References Cited

U.S. PATENT DOCUMENTS

| | | | | |
|---|---|---|---|---|
| 4,955,573 | A | * | 9/1990 | Horvath .................... 248/313 |
| 5,370,288 | A | * | 12/1994 | Field ............................ 224/223 |
| 6,241,200 | B1 | * | 6/2001 | Camporeale et al. ........ 248/68.1 |
| 2005/0266707 | A1 | | 12/2005 | Franks |

FOREIGN PATENT DOCUMENTS

| | | |
|---|---|---|
| FR | 65 516 E | 2/1956 |
| GB | 373335 A | 5/1932 |
| GB | 1 579 904 A | 11/1980 |

* cited by examiner

WIRE CLAMPING ASSEMBLY

RELATED APPLICATION

This application claims priority under 35 U.S.C. §119 to European Patent Application No. 11178967.3 filed in Europe on Aug. 26, 2011, the entire content of which is hereby incorporated by reference in its entirety.

FIELD

The present disclosure relates to a wire clamping assembly.

BACKGROUND INFORMATION

Several different types of wire clamping assemblies are known in the art.

SUMMARY

A wire clamping assembly is disclosed comprising: a support body; a clamping strip; at least one clamping screw, the support body having a first surface and having a second surface on an opposite side of the support body relative to the first surface, the clamping strip having a first end and a second end, the at least one clamping screw being positioned for directing a clamping force to a clamping force receiving portion of the clamping strip for clamping at least one wire between the clamping strip and the first surface of the support body, wherein the clamping strip is a flexible strip, the clamping force receiving portion of the clamping strip being located on the side of the second surface of the support body; and fastening means for fastening the first end and the second end of the clamping strip to the support body, the at least one clamping screw being positioned for co-operating with the fastening means through the clamping strip for clamping the at least one wire between the clamping strip and the first surface of the support body.

BRIEF DESCRIPTION OF THE DRAWINGS

In the following, exemplary embodiments will be described in greater detail with reference to the attached drawings, in which.

DETAILED DESCRIPTION

An exemplary wire clamping assembly as disclosed herein includes a flexible strip as a clamping strip, and includes a clamping force receiving portion of the clamping strip located on an opposite side of the support body relative to both a head of corresponding clamping screw and at least one wire to be clamped.

An exemplary wire clamping has a simple and compact structure, is inexpensive to manufacture, and is easy to use. Since the clamping strip is a flexible strip the wire clamping assembly according to present invention can be used to clamp wires having cross sections of different shapes and sizes.

Figure 1:
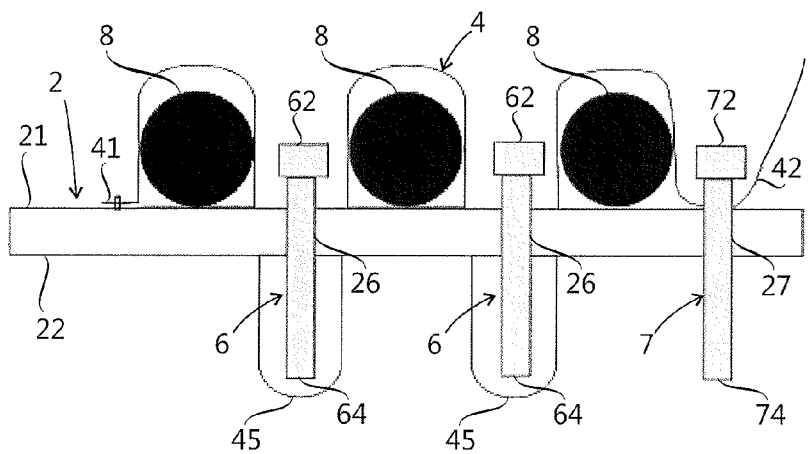
FIG. 1 shows an exemplary wire clamping assembly for clamping three wires.

FIG. 1 shows an exemplary wire clamping assembly having a support body 2, a clamping strip 4, two clamping screw 6 and fastening means. The support body 2 has a first surface 21 and a second surface 22 on opposite side of the support body 2 relative to the first surface 21. The wire clamping assembly is adapted (i.e., configured) for clamping three wires 8 between the clamping strip 4 and the first surface 21 of the support body 2.

The clamping strip 4 is a flexible strip having a first end 41 and a second end 42. The fastening means are adapted for fastening the first end 41 and the second end 42 of the clamping strip 4 on the side of the first surface 21 of the support body 2. The fastening means can include a fixed connection between the first end 41 of the clamping strip 4 and the support body 2, and a screw connection between the second end 42 of the clamping strip 4 and the support body 2. The fixed connection can include a rivet joint, a weld joint or a soldered joint, for example. The screw connection includes a fixing screw 7 having a threaded portion.

Figure 2:
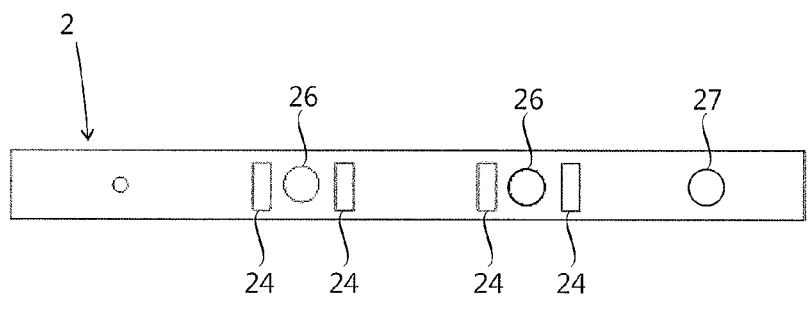
FIG. 2 shows an exemplary support body of the wire clamping assembly of FIG. 1.

FIG. 2 shows the support body 2 from direction of the first surface 21. The support body 2 can include four clamping strip openings 24, two clamping holes 26 and a fastening hole 27. Each of the clamping strip openings 24 is adapted to allow the clamping strip 4 to pass from one side of the support body 2 to the other side of the support body 2. The clamping strip 4 passing from one side of the support body 2 to the other side of the support body 2 forms three loops on the side of the first surface 21 of the support body 2, and two loops on the side of the second surface 22 of the support body 2.

Each of the three loops on the side of the first surface 21 of the support body 2 is adapted to receive a corresponding wire 8. Each of the two loops on the side of the second surface 22 of the support body 2 can include a clamping force receiving portion 45. Each of the clamping screws 6 is adapted to direct a clamping force to corresponding clamping force receiving portion 45 of the clamping strip 4 for clamping an adjacent wire 8 between the clamping strip 4 and the first surface 21 of the support body 2. Each of the clamping screws 6 is adapted to direct the clamping force through a distal end 64 thereof, the distal end 64 being an opposite end relative to a head 62 of the clamping screw 6. Each of the clamping screws 6 is adapted to be in direct contact with the clamping force receiving portion 45 of the clamping strip 4 through the distal end 64. There is a clamping screw 6 between each adjacent wires 8.

The clamping screws 6 co-operate with the fastening means for clamping wires 8 between the clamping strip 4 and the first surface 21 of the support body 2. Clamping of wires 8 is achieved by forces provided by the clamping screws 6 and counterforces provided by the fastening means.

Each one of the clamping holes 26 is a threaded hole adapted to cooperate with a threaded portion of corresponding clamping screw 6 for achieving the clamping force. The fastening hole 27 is a threaded hole adapted to cooperate with the threaded portion of the fixing screw 7 for fastening the second end 42 of the clamping strip 4 against the support body 2. In use the second end 42 of the clamping strip 4 is pressed between a head 72 of the fixing screw 7 and the first surface 21 of the support body 2. The fixing screw 7 may be identical to the clamping screws 6.

Figure 3:
FIG. 3 shows an exemplary clamping strip of the wire clamping assembly of FIG. 1.

FIG. 3 shows the clamping strip 4 as a planar strip detached from the support body 2. As shown in FIG. 3, the fastening means can include a plurality of fastening openings 47 in the second end 42 of the clamping strip 4, each of the plurality of fastening openings 47 being dimensioned to receive a threaded portion of a fixing screw 7 for enabling the screw connection between the second end 42 of the clamping strip 4 and the support body 2. The plurality of fastening openings 47 provides a length adjustment for an active portion of the clamping strip 4. One of the plurality of fastening openings 47 is chosen based on outer diameters of wires 8 to be clamped, and the fixing screw 7 is mounted in the chosen fastening opening 47. If outer diameter of the wires to be clamped is large the length of the active portion of the clamping strip 4 is adjusted to be long by choosing a fastening opening 47 close to the second end 42 of the clamping strip 4. If outer diameter of the wires to be clamped is small the length of the active portion of the clamping strip 4 is adjusted to be short by choosing a fastening opening 47 farther from the second end 42 of the clamping strip 4. Herein the active portion of the clamping strip 4 refers to the portion between the first end 41 and the chosen fastening opening 47 provided with a fixing screw 7. For example, only the active portion of the clamping strip 4 participates in providing the clamping of the at least one wire 8.

Figure 4:
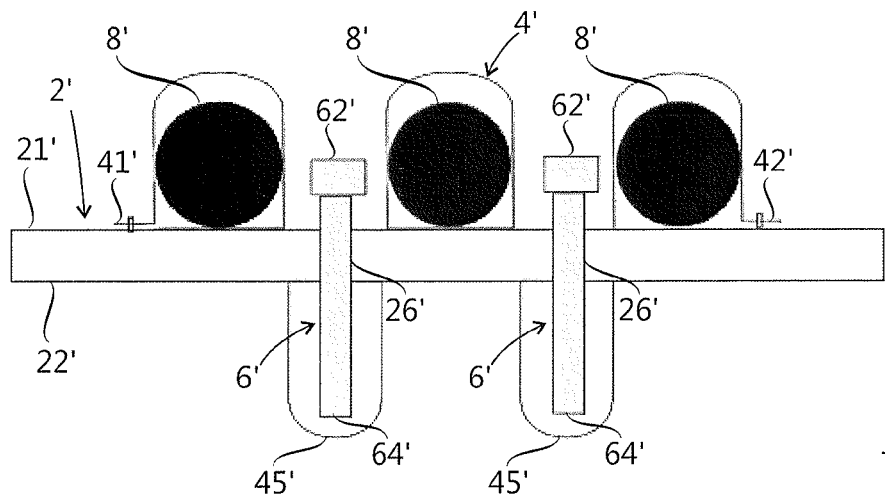
FIG. 4 shows an exemplary wire clamping assembly with a fixed connection at both ends of a clamping strip.

FIG. 4 shows an exemplary wire clamping assembly according to an alternative embodiment. The wire clamping assembly of FIG. 4 differs from the illustrated assembly of FIG. 1 in that the fastening means includes a fixed connection both between the first end 41' of the clamping strip 4' and the support body 2' and between the second end 42' of the clamping strip 4' and the support body 2'. In a further alternative exemplary embodiment the fastening means can include a screw connection both between the first end of the clamping strip and the support body and between the second end of the clamping strip and the support body.

Figure 5:
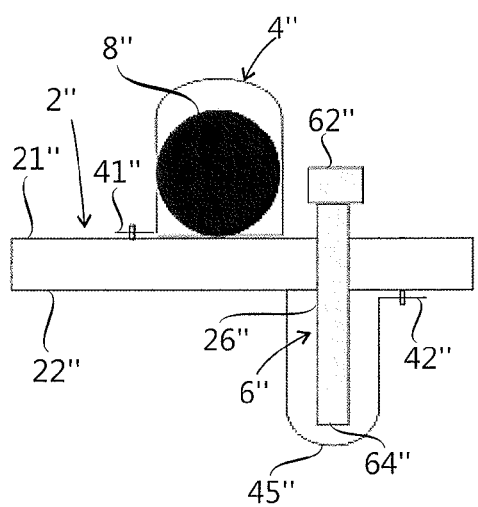
FIG. 5 shows an exemplary wire clamping assembly for clamping one wire.

FIG. 5 shows an exemplary wire clamping assembly for clamping one wire. The wire clamping assembly of FIG. 5 includes only one clamping screw 6". The fastening means can include a fixed connection both between the first end 41" of the clamping strip 4" and the support body 2" and between the second end 42" of the clamping strip 4" and the support body 2". The first end 41" of the clamping strip 4" is fixed on the first surface 21" of the support body 2", and the second end 42" of the clamping strip 4" is fixed on the second surface 22" of the support body 2".

Figure 6:
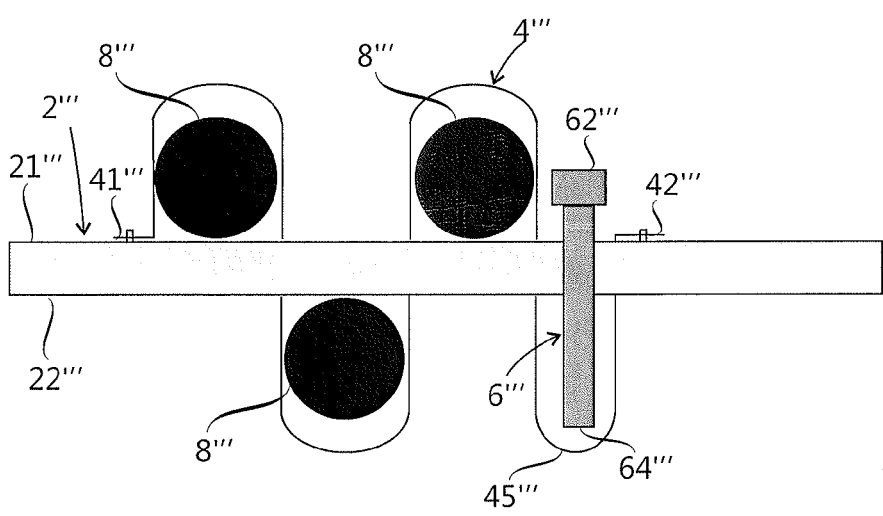
FIG. 6 shows an exemplary two-sided wire clamping assembly for clamping three wires.

FIG. 6 shows a two-sided wire clamping assembly for clamping three wires 8'''. The clamping strip 4''' passing from one side of the support body 2''' to the other side of the support body 2''' forms two loops on the side of the first surface 21''' of the support body 2''', and two loops on the side of the second surface 22''' of the support body 2'''. The first loop and the third loop of the assembly are located on the side of the first surface 21''' of the support body 2'''. Both the first loop and the third loop are adapted to receive a corresponding wire 8'''. The second loop and the fourth loop of the assembly are located on the side of the second surface 22''' of the support body 2'''. The second loop is adapted to receive a wire 8'''. The fourth loop can include a clamping force receiving portion 45'''. The clamping screw 6''' is adapted to direct a clamping force to the clamping force receiving portion 45''' for clamping the first wire and the third wire against the first surface 21''' of the support body 2''', and for clamping the second wire against the second surface 22''' of the support body 2'''.

In the two-sided wire clamping assembly of FIG. 6 the fastening means can include a fixed connection both between the first end 41''' of the clamping strip 4''' and the support body 2''' and between the second end 42''' of the clamping strip 4''' and the support body 2'''. The clamping screw 6''' cooperates with the fastening means for clamping wires 8''' between the clamping strip 4''' and the support body 2'''.

Although wires depicted in the Figures all have a circular cross section the wire clamping assembly as disclosed can be used to clamp wires having different cross sections. For example, one wire clamped by a wire clamping assembly adapted for clamping a plurality of wires may have a rectangular cross section while another clamped wire has a polygon shaped cross section, or any other desired shape or shapes.

A wire clamping assembly as disclosed herein can be adapted for earthing the at least one wire which the wire clamping assembly is adapted to clamp. In such embodiment the support body and/or the clamping strip can be an earthed component. Further, a wire clamping assembly as disclosed herein can be configured as an electrical connector or other structure.

It will be apparent to those skilled in the art that the inventive concepts disclosed herein can be implemented in various ways. The invention and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A wire clamping assembly, comprising:
a support body;
a clamping strip;
at least one clamping screw, the support body having a first surface and having a second surface on an opposite side of the support body relative to the first surface, the clamping strip having a first end and a second end, the at least one clamping screw being positioned for directing a clamping force to a clamping force receiving portion of the clamping strip for clamping at least one wire between the clamping strip and the first surface of the support body such that the at least one wire contacts the first surface of the support body, wherein the clamping strip is a flexible strip, the clamping force receiving portion of the clamping strip being located on the side of the second surface of the support body; and
fastening means for fastening the first end and the second end of the clamping strip to the support body, the at least one clamping screw being positioned for co-operating with the fastening means through the clamping strip for clamping the at least one wire between the clamping strip and the first surface of the support body, the at least one clamping screw being configured to directly contact the clamping force receiving portion of the clamping strip,
wherein the first surface of the support body and the second surface of the support body face in opposite directions, the support body comprises:
a plurality of clamping strip openings for the clamping strip to pass from one side of the support body to the other side of the support body, wherein the support body is a one-piece body comprising at least one clamping hole, the at least one clamping hole being a threaded hole for co-operating with a threaded portion of a corresponding clamping screw for achieving a clamping force.

2. A wire clamping assembly according to claim 1, for clamping a plurality of wires between the clamping strip and the first surface of the support body, the wire clamping assembly comprising:
   a plurality of clamping screws, with a clamping screw being positioned to be located between each adjacent wire during operation.

3. A wire clamping assembly according to claim 1, wherein the fastening means are configured to fasten both the first end and the second end of the clamping strip on the side of the first surface of the support body during operation.

4. A wire clamping assembly according to claim 1, wherein the fastening means comprise:
   a fixed connection between the first end of the clamping strip and the support body.

5. A wire clamping assembly according to claim 4, wherein the fastening means comprise:
   a fixed connection between the second end of the clamping strip and the support body.

6. A wire clamping assembly according to claim 1, wherein the fastening means comprise:
   a screw connection between the second end of the clamping strip and the support body for fastening the second end of the clamping strip against the support body, the screw connection including at least one fixing screw having a threaded portion.

7. A wire clamping assembly according to claim 6, wherein the fastening means comprise:
   a plurality of fastening openings in the second end of the clamping strip, each of the plurality of fastening openings being dimensioned to receive a threaded portion of a fixing screw for enabling the screw connection between the second end of the clamping strip and the support body, the plurality of fastening openings providing a length adjustment for an active portion of the clamping strip.

8. A wire clamping assembly according to claim 6, wherein the screw connection between the second end of the clamping strip and the support body comprises:
   a fastening hole in the support body, the fastening hole being a threaded hole configured to co-operate with a threaded portion of a corresponding fixing screw for fastening the second end of the clamping strip against the support body.

9. A wire clamping assembly according to claim 1, configured for earthing at least one wire, wherein the support body and/or the clamping strip is an earthed component.

10. A wire clamping assembly according to claim 2, wherein a number of clamping screws is less than a number of wires to be clamped.

11. A wire clamping assembly according to claim 1, wherein each of the clamping screws is adapted to direct the clamping force through a distal end thereof, the distal end being an opposite end relative to a head of the clamping screw, and each of the clamping screws is adapted to be in direct contact with the clamping force receiving portion of the clamping strip through the distal end.

* * * * *